United States Patent [19]
Tran et al.

[11] Patent Number: 6,096,454
[45] Date of Patent: Aug. 1, 2000

[54] SURFACE MODIFICATIONS FOR CARBON LITHIUM INTERCALATION ANODES

[75] Inventors: Tri D. Tran, Livermore; Kimio Kinoshita, Cupertino, both of Calif.

[73] Assignee: The Regents of the University of California, Oakland, Calif.

[21] Appl. No.: 09/144,167

[22] Filed: Aug. 31, 1998

[51] Int. Cl.[7] .................................................. H01M 10/24
[52] U.S. Cl. .................................. 429/231.8; 429/231.95
[58] Field of Search .............................. 429/231.8, 231.95

[56] References Cited

U.S. PATENT DOCUMENTS 5,401,598  3/1995  Miyabayashi et al. .................. 429/218

*Primary Examiner*—Maria Nuzzolillo
*Assistant Examiner*—Monique Wills
*Attorney, Agent, or Firm*—Alan H. Thompson

[57] ABSTRACT

A prefabricated carbon anode containing predetermined amounts of passivating film components is assembled into a lithium-ion rechargeable battery. The modified carbon anode enhances the reduction of the irreversible capacity loss during the first discharge of a cathode-loaded cell. The passivating film components, such as $Li_2O$ and $Li_2CO_3$, of a predetermined amount effective for optimal passivation of carbon, are incorporated into carbon anode materials to produce dry anodes that are essentially free of battery electrolyte prior to battery assembly.

33 Claims, No Drawings

SURFACE MODIFICATIONS FOR CARBON LITHIUM INTERCALATION ANODES

The United States Government has rights in this invention pursuant to Contract No. W-7405-ENG-48 between the United States Department of Energy and the University of California for the operation of Lawrence Livermore National Laboratory.

BACKGROUND OF THE INVENTION

Lithium-ion cells and batteries are secondary (i.e., rechargeable) energy storage devices useful as portable power sources for many important applications including cellular phones, portable computers, camcorders, and electric vehicles. One such lithium-ion cell comprises essentially a carbonaceous anode, a lithium-retentive cathode, and a non-aqueous, lithium-ion-conducting electrolyte therebetween. The carbon anode comprises any of the various types of carbon (e.g., graphite, coke, carbon fiber, etc.) which are capable of reversibly storing lithium species, and which are bonded to an electrically conductive current collector (e.g. copper foil) by means of a suitable organic binder (e.g., polyvinyllidene difluoride, PVdF). The cathode comprises such materials as transition metal chalcogenides (e.g., $LiCoO_2$) or electronically conductive polymers (e.g., polyaniline, polythiophene and their derivatives) which are bonded to an electrically conductive current collector (e.g., aluminum foil) by a suitable organic binder.

Carbon anodes and transition metal chalcogenide cathodes reversibly store lithium species by an insertion mechanism wherein lithium species become retained within the lattices of the carbon and chalcogenide materials. In the carbon anode, charge neutralization occurs between the lithium ions and the $\pi$ bonds of the carbon, whereas in the metal chalcogenide cathode, charge transfer takes place between the lithium species and the transition metal component of the metal chalcogenide. Chalcogenide compounds include oxides, sulfides, selenides, and tellurides of such metals as vanadium, titanium, chromium, copper, molybdenum, niobium, iron, nickel, cobalt and manganese with nickel and cobalt oxides being among the more popular cathode materials used commercially. Manganese oxide has been proposed as a low cost alternative to the nickel and cobalt oxides.

The electrolyte in such lithium-ion cell comprises a lithium salt dissolved in a non-aqueous solvent which may be (1) completely liquid, (2) an immobilized liquid, (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, and polycarbonates, and may be polymerized in situ in the presence of the electrolyte to trap the electrolyte therein as the polymerization occurs. Known polymers for pure polymer electrolyte systems include polyethylene oxide (PEO), polymethylenepolyethylene oxide (MPEO), or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, and $LiO_2CF_3$, $LiAsF_6$, and $LiSbF_6$. Known organic solvents for the lithium salts include, for example, alkylcarbonates (e.g., propylene carbonate, ethylene carbonate), dialkyl carbonates, cyclic ethers, cyclic esters, glymes, lactones, formates, esters, sulfones, nitrites, and oxazolidinones.

Because of several problems associated with the intial start-up (i.e., formation) of the lithium-ion cell, excess lithium ions (species) are generally preloaded in the cell components, typically at the cathode side prior to assembling the cell. A common approach to manufacturing lithium-ion cells having carbon anodes is to couple excess lithium-retentive cathode material before assembling the cell. Carbon-anode, lithium-ion cells assembled from lithium-retentive cathodes which have been preloaded with lithium are hereinafter referred to as "cathode-loaded" cells.

The first problem, in cathode-loaded cells is inefficiency caused by the loss of useful capacity (i.e., as measured by the amount of lithium pre-loaded into the cathode) during the first charge-discharge cycle of the cell in that it is otherwise available for subsequent reversible interaction with the electrodes. In order to compensate for the amount of lithium expected to be lost (i.e., rendered irreversible) in the first cycle, a common practice in the art is to provide excess lithium-retentive cathode materials. Such irreversible capacity loss is usually referred hereinafter as ICL. This, of course, results in a cell having electrodes which are stoichiometrically unbalanced, as far as their relative reversible lithium storing capability is concerned. Such excess cathode material adds to the size, weight and cost of the cell and correspondingly reduces its energy and power density.

The second problem, associated with the cathode-loaded/carbon cells is gas production occuring during the first cycle of the battery attributable to decomposition of the electrolyte's solvent. Such gassing not only produces a combustible gas but can cause thermal and/or mechanical stress in full assembled cells, swelling of sealed cells, separation of the active material from its metal substrate current collector and depletion and contamination (i.e., by reaction byproducts) of the electrolyte. All of which contribute to increases to the cells internal resistance.

The third problem in cathode-loaded cells deals with the depletion of useful, pre-determined amounts of ionically-conducting electrolyte. The problem is especially severe in the cases with immobilized electrolytes or polymer electrolytes or "dry" cells. The cells are typically assembled with electrolyte-unsaturated carbon anodes which only become fully wetted with electrolyte after the cell's first cycle as electrolyte being carried from the electrolyte region of the cell into the carbon by the migrating lithium ions. Such movement of electrolyte out of the electrolyte region and into the carbon anode is particularly troublesome in immobilized-electrolyte cells, since the electrolyte region is depleted of some of its electrolyte and accordingly results in increased internal resistance within the cell.

The aforesaid problems are particularly troublesome in larger batteries such as might be used to propel an electric or hybrid-electric vehicle. The first and second of these problems are seen to be attributed at least in part to the presence of "active sites" throughout the carbon particles. Active sites are defect, surface and edge sites which are characterized by unsaturated interatomic bonds that are prevalent on the ends of the carbon chains and at stacking faults or cracks in the carbon. Such sites have energy potentials above the electrodepostion potential of lithium. High concentrations of active sites are particularly prevalent in fully high surface area carbonaceous materials, particularly in those not exposed to high heat treatment (T<2000° C.) and/or less ordered (i.e. graphitized) carbon. Active carbon sites are troublesome in cathode-loaded cells because they are seen to promote (1) decomposition of the electrolyte's solvent, (2) gassing within the assembled cell incident to such decomposition, and (3) the non-useful consumption of some of the preloaded lithium thereby rendering such lithium no longer available for reversible interaction between the electrodes. Moreover, the extent of electrolyte decomposition is sensitive to the surface area of the carbon. Smaller carbon particles (usually having higher surface areas) tend to have more active sites, and accordingly result in more decomposition (e.g., gassing) of the pre-lithiation solution.

It is generally accepted that during the first cycle of a rechargeable lithium-ion cell, the surface of the electrodes (particularly the carbonaceous anode) become covered by a passivating layer or film, often called a solid electrolyte interphase (SEI), containing a relatively complex ratio of several passivating film components, such as lithium-containing compositions (e.g., $Li_2CO_3$, $Li_2O$, and Li-alkyl $CO_3$). The SEI plays a major role in determining electrode and battery behavior and properties which include ICL, lithium deposition-dissolution efficiency, cycle life, and the like. The role of the SEI is to separate the negative electrodes from the electrolytes, to eliminate (or drastically reduce) the transfer of electrons from the electrodes to the electrolytes and also the transfer of solvent molecules and salt anions from the electrolytes to the electrodes which prevents further electrolyte decomposition and gas formation. Heretofore, the compositions or components of the SEI on the electrode, and their ratio to each other, have been dependent entirely upon and determined by the compositions of the electrolytes and electrodes of the particular lithium-ion electrochemical cell in which the electrode is first cycled. The SEI or passivating layer on a "prewet" electrode produced from the first cycle of an electrochemical cell contains an "electrochemically-produced ratio" of the passivating film components. U.S. Pat. No. 5,743,921, issued to Nazri et al., describes the use of a prewet electrode. In view of the importance of the role of the SEI for reducing ICL and other performance issues, a need exists for an improved carbonaceous anode, its preparation and use in cathode-loaded, lithium-ion rechargeable batteries and cells.

SUMMARY OF THE INVENTION

The invention relates to a novel carbonaceous electrode, its preparation and use in a method for reducing the ICL during the first discharge and subsequent discharge/charge performance of lithium-ion rechargeable cells (e.g., batteries). The invention involves a non-electrochemical preparation of dry carbonaceous materials having at least one passivating film component. In the method of the invention, a carbonaceous material is contacted with one or more passivating film components (and/or precursors of such components) and heated in the presence of a gas to form a passivating layer on the carbonaceous material. A modified and prefabricated carbonaceous anode of the invention can replace and/or enhance passivation of (i.e., electrochemically prepared) carbonaceous anodes that are destined for subsequent assembly into cathode-loaded cells.

The invention also relates to the method of making a cathode-loaded, secondary, lithium-ion cell wherein a prefabricated, lithium-intercalatable, carbon anode containing a predetermined amount of passivating film component(s) is positioned opposite a lithium-retentive cathode preloaded with a quantity of lithium species and a non-aqueous, lithium-ion-conducting electrolyte therebetween (i.e., separating the anode from the cathode). More specifically, the present invention contemplates the improvement wherein a carbon anode material having at least one passivating film component and essentially free of destined electrolyte is prefabricated and then assembled into a lithium-ion, rechargeable battery cell. A substantially-reduced quantity of preloaded cathode material can be achieved in the cell of the invention containing the improved carbonaceous anode.

The carbon anode is prepared to contain predetermined quantities of passivating components that form a passivating layer which separates the anode from the electrolytes, and eliminates (or drastically reduces) the transfer of electrons from the electrodes to the electrolytes and also the transfer of solvent molecules and salt anions from the electolytes to the electrodes. Such predetermined amount(s) of passivating film component(s) in the passivating layer compensates for a large fraction of the unuseful loss of lithium species from the cathode to the active sites of the carbon anode during the first cycle. The passivating layer of the lithium-intercalatable carbonaceous anode preferably has a predetermined composition which provides optimum compatibility with the cell's electrolyte. Thus, only a small amount of preloaded cathode materials in excess of that needed for the reversibly shuttling between the carbon anode and the transition metal oxide cathode is needed to complete the formation of the electrochemically-produced passivating layer regardless of which electrolyte is used in the cell. Depending on the choice of cathode materials, some additional small amount of the preloaded cathode materials may be needed to compensate for any inefficiency that is inherent to a particular preloaded cathode material (e.g., $LiMn_2O_4$). This leads to the fabrication of batteries having balanced or closely-matched electrodes (i.e., reversible-lithium-capacity-wise), as well as higher energy and power densities.

DETAILED DESCRIPTION OF THE INVENTION

Carbonaceous materials useful for fabricating carbon anodes of the invention include those carbon materials capable of being intercalated with lithium. Preferably the carbonaceous materials employed are solids, including powders and fibers, containing highly graphitic (i.e., ordered) compounds, partially graphitized and/or amorphous (i.e., disordered) carbons. Samples of preferred materials are synthetic or natural graphite, graphitized petroleum coke or carbon black, green coke, needle coke, sponge coke, carbon black, powdered graphite, phosphorous-doped polyacrylonitrile-based cargons such as those described in detail in several articles listed herein: *Commercial Carbonaceous Materials as Lithium Intercalation Anodes*, by T. D. Tran, et al. in the *Journal of the Electrochemical Society*, vol. 142, No. 10, pp. 3297–3302, October (1995); T. D. Tran et al., *Lithium Intercalation in Porous Carbon Anodes*, in the *Materials Research Society Proceeding* Volume 371, 449, (1995); T. D. Tran et al., *Lithium Intercalation in Heat-Treated Petroleum Cokes*, in the *Solid State Ionics*, vol. 68, 106 (1997); and D. Derwin et al., *Commercial Cokes and Graphites as Anode Materials for Lithium-Ion Cells*, in the *Materials Research Society Proceeding*, Volume 496, 575, (1998). A highly preferred carbonaceous material contains graphitized petroleum cokes and graphites capable of lithium intercalation exceeding 260 mAh/g.

Carbonaceous materials effective for use in electrodes of the invention generally have high electrical conductivity, i.e., specific conductivity of above about 100 Siemens/cm, and a low surface area, often less than about 5 $m^2/g$. The particle morphology of the carbon can include spherical shapes with edge-type surfaces, convenient for facile lithium intercalation and uniform sizes usually less than about 20 microns. The particle microstructure must be indicative of graphitic structures including a graphene layer separation distance, i.e., $d_{002}$, from about 3.35 Å to about 3.38 Å, and a stacking layer thickness, e.g., $L_c$, of greater than 100 Å.

The carbon electrode of the invention is prepared by contacting the carbonaceous material with a passivating film component or a precursor of the passivating film component to form a passivating layer on the surface of the solid porous carbonaceous material. Reference herein to passivating film components includes precursors of such passivating film components. Any of several methods of contacting can be utilized, such as impregnation, commulling, gassing and vapor deposition. Gaseous mixtures or single compound gases can be passed over and/or through the porous carbonaceous material under either oxidizing or reducing conditions, normally at elevated temperatures from ambient, to either pretreat the carbonaceous material active sites prior to formation of the passivating film component or to directly form the passsivating film component on the carbon surface. Examples of gases include argon, hydrogen and $CO_2$.

A preferred contacting method includes impregnating the carbonaceous material with an impregnation solution, preferably an aqueous solution or a mixture of solvent, such as alcohol, and water, containing passivating film components such as lithium containing components and/or its (their) precursors. Other passivating film components include lithium hydroxide, LiOH, lithium oxides, $Li_2O$, lithium alkyl carbonates, which are dependent on electrolyte types. Several methods may be employed to impregnate the porous carbonaceous materials including spraying the carbon with the impregnation solution or multi-dipping the carbon in the impregnation solution (multiple impregnation steps) with or without intermittent drying and/or heating. Preferred methods, however, require soaking the porous carbon in an impregnation solution, circulating the solid carbon therein, or circulating the solution about the solid carbon, as for example, the pore volume or pore saturation technique, the continuous solution impregnation technique, and the like. The pore saturation method involves dipping the carbon into an impregnation solution having a volume usually sufficient to fill the pores of the carbon and, on occasion, may be up to about 10 percent excesses. The concentrations of passivating film components in the solution during impregnation by this technique may be somewhat higher than those utilized in other methods because the ratios of passivating film components in the final modified carbon electrode are determined directly by solution composition. Another preferred impregnation method involves multiple impregnations wherein intermittent evacuation and pressurization steps ensure more complete dispersion and/or deposition of the passivating film components (or precursors thereof) into the pores of the carbonaceous material.

The amount of a passivating film component retained on the carbon during impregnation will depend largely on physical characteristics of the carbonaceous material, inter alia, surface area, pore volume, and surface active carbon sites, more particularly defect, kink, and edge sites. Broadly speaking, the carbonaceous materials having lower surface areas produce electrodes having a lower ICL. Carbonaceous materials useful in the invention have a surface area above about 0.5 $m^2/g$ and usually in the range from about 1 to about 30 $m^2/g$ (as measured by the B.E.T. method). It is preferred that the surface area be above 3 $m^2/g$ in the range from about 3 to about 15 $m^2/g$. Examples include sponge green coke (1.2 $m^2/g$), fuel green coke (3.3 $m^2/g$), and SFG6 graphite (15.2 $m^2/g$).

In an unusual feature of the invention, the carbon electrode is prepared with a catalytic material in addition to the passivating film component(s) to improve the ICL property of the electrode. For example, a pretreatment step prior to contacting the carbon with the passivating film components, or precursors thereof, includes electrolessly depositing at least one colloidal metal species to enhance the wettability of the carbonaceous surface, as disclosed for example in U.S. Pat. No. 3,011,920 issued to Shipley, the disclosure of which is incorporated by reference herein in it entirety. More particularly, Sn—Pd pretreatment steps to induce carbon surface activation and/or introduce seeding, can be employed prior to incorporating at least one passivating film component (e.g., $Li_2CO_3$, $Li_2O$, Li-alkyl $CO_3$, and the like) onto the surface of the carbon electrode material. The Sn—Pd pretreatment includes dissolving a palladium salt in hydrochloric acid, adding sodium stannate and excess stannous chloride necessary to produce an active colloidal solution for electroless deposition. The electroless deposition of colloidal tin species prior to passivating lithium containing film components is highly preferred.

After such contacting, the carbonaceous material containing the passivating film component(s), is dried. The drying can be accomplished by evacuation of liquids from the carbonaceous material, but usually by heating the material in the presence of a gas (or gaseous mixture), such as an oxidizing atmosphere. An oxidizing atmosphere may include an oxidizing gas such as free oxygen, oxides, peroxides, or any agent capable of oxidizing a passivating film component, or its precursor, to the desirable component (s) of the passivating layer on the carbon. A preferred oxidizing atmosphere contains carbon dioxide ($CO_2$), normally under atmospheric or superatmospheric pressures, usually up to about 75 atmospheres, and preferably about 1 to about 50 atmospheres, and generally at least room temperature, preferably at slightly elevated temperatures, usually from about 20 degrees C. to about 120 degrees C., and preferably from about 25 degrees C. to about 50 degrees C. The $CO_2$ acts as an oxidizing agent to the surface of the carbonaceous material containing passivating film components, and/or precursors thereof, and converts precursors of passivating film components to carbonates. For instance, a highly preferred passivating film component of the finished carbon electrode, e.g., $Li_2CO_3$, it formed from the reaction of $CO_2$ with lithium-containing passivating film component precursors on the carbon surface.

The passivating film component(s) on a finished electrode of the invention usually comprise about 0.001 to about 0.5 dry weight percent of the finished carbonaceous electrode, calculated as Li. The passivating layer thickness associated with such component(s) with about 50% $Li_2CO_3$ is in the range from 1 to 200 Å for a typical carbon anode having a surface area less than 5 $m^2/g$. Preferably, the finished, prefabricated carbonaceous anode, which is ready for assembly into a lithium-ion cell, contains about 0.005 to about 0.5 dry weight percent, calculated as Li, of a lithium-containing passivating film component. The corresponding passivating layer thickness associated with such component(s) with 50% $Li_2CO_3$ is in the range from 5 to 70 Å for a typical carbon anode having a surface area less than 5 $m^2/g$. Examples of passivating film components include lithium-containing components such as carbonates, alkyl carbonates, oxides, hydroxides, halides (particularly F, Cl and Br), and hydrides. Preferred passivating film components include $Li_2CO_3$, $Li_2O$, LiOH, and Li-alkylcarbonates, with $Li_2CO_3$ being the most preferred.

Of course, any effective amount of one or more of the passivating film components predetermined to be effective in a cell can be incorporated into an electrode as a supplement to a passivating layer on an electrode having an electrochemically-produced ratio of passivating film components. For example, a particular passivating film layer produced upon a carbonaceous anode by electrochemical deposition from a lithium-ion electrochemical cell may contain a weight ratio for $Li_2CO_3:Li_2O:C_2H_5OCO_2$—Li of 5:3:2 and after application of the method of the invention could further contain supplemental $Li_2CO_3$ in an amount that alters the final weight ratio to 7:3:2.

One advantage of the invention allows the skilled artisan to prefabricate carbonaceous anodes to contain any desired and/or predetermined amount of one or more passivating film components. In contrast to conventional methods which limit the composition and ratio of passivating film components to that produced by a given electrochemical cell, the method of the invention allows the skilled artisan to prefabricate those dry electrodes to contain any desired ratio of passivating film components (other than the electrochemically-produced ratio) that can reduce ICL or improve other properties for the subject cell.

In the non-electrochemical preparation of the electrodes of the invention, the finished electrodes for assembly into the destined cell of the invention contain essentially no electrolytes of the cell destined for use. Thus, the electrode and assembled, operational cell of the invention can be produced to have less weight or size than a comparable electrode and/or cell.

In the method of the invention, the predetermined amount of passivating film component(s) in the form of LiOH, $Li_2O$ and particularly, $Li_2CO_3$ is incorporated into the carbon by depositing substantially only enough lithium and/or lithium containing components and/or precursors to lithium components into the carbon as is needed to deactivate the active sites on the carbon.

The lithium intercalation takes place during operation of the lithium-ion rechargeable cells (batteries) of the invention at extremely negative potentials and consequently aqueous solutions are not used as solvents in the cells. Any of the non-aqueous electrolytes presently known to be effective as electrolytes in lithium-ion, cathode-loaded and rechargeable cells (including those mentioned hereinbefore) are employed in the cells of the present invention. Likewise, the cathodes useful in the cells of the present invention include those well known in the art (including those mentioned hereinbefore).

A cathode-loaded, secondary, lithium-ion cell is assembled wherein the prefabricated, lithium-intercalatable, carbon anode of the invention, containing at least one passivating film component (and optionally electrolyte-free), is positioned opposite a lithium-retentive cathode preloaded with a quantity of lithium species and a non-aqueous, lithium-ion-conducting electrolyte therebetween (i.e., separating the anode from the cathode).

In accordance with a preferred embodiment of the invention, the lithium-ion cell's cathode comprises a transition metal chalcogenide, the carbonaceous anode contains graphite and the electrolyte is either free-standing or immobilized between the anode and the cathode. Most preferably, the transition metal chalcogenide comprises manganese oxide, the electrolyte is a non-aqueous (e.g., organic) solvent or a mixture of at least two organic solvents containing lithium-ion conducting lithium salt or salts, and the carbonaceous anode contains up to about 1.5 wt. % of additional lithium-containing passivating film components, calculated as Li, compared to that of a lithium-ion cell-produced ratio of passivating film components.

The invention is further illustrated by the following example which is illustrative of specific modes of practicing the invention and is not intended as limiting the scope of the invention as defined in the appended claims.

EXAMPLE 1

Carbonaceous anodes are prepared prior to assembly and operation of a lithium-ion rechargeable cell. Activated woven carbon fibers (A10, Spectra Corp.) are treated by the method of the invention to produce dried electrodes that are compared to an untreated comparable electrode (i.e., Electrode A).

Without any pretreatment, the activated carbon fibers (particle size 10–15 microns known as "acf") are shaped into electrode forms and undergo an impregnation for one-half hour with a 0.16 M lithium hydroxide aqueous solution containing 10 volume percent ethanol (i.e., EtOH), including multiple (3) evacuation (1 psia) and pressurization (25 psia) steps for 5 minutes each. Excess lithium-containing solution is removed from the electrode and the electrode dried overnight, then under vacuum (1 psia) at 110 degrees C. for one hour. The dried electrode is introduced into a jacketed 85 mm×300 mm pressure vessel (Polaroa Equipment Ltd., Watford, England). Pressurized $CO_2$ (800 psia) is continuously flushed through the vessel at a slow rate for 3 hours at 25 degrees C. to form $Li_2CO_3$. The modified electrode (i.e., Electrode B) is then dried at 110 degrees C. for 30 minutes and contains 0.3 weight percent of lithium-containing components, calculated as Li, (including $Li_2CO_3$), prior to assembly of the electrodes into a lithium-ion electrochemical cell.

Another electrode, i.e., Electrode C, is prepared in the same manner as Electrode B, except the impregnating solution contains 1.6 M lithium hydroxide in a 100 percent aqueous media, i.e., in the absence of ethanol in the impregnating solution. The modified elctrode contains a comparative amount of lithium-containing components, including $Li_2CO_3$, to that in Electrode B.

Another electrode, i.e., Electrode D, is prepared in the same manner as Electrode B, except the entire preparation method is repeated a second time; however, the amount of lithium-containing components, including $Li_2CO_3$, is comparable to that of Electrodes B and C.

Another electrode, i.e., Electrode E, is prepared in the same manner as Electrode B, except the activated carbon fibers are initially electrolessly treated with Pd/Sn colloidal particles in accordance with the disclosure in U.S. Pat. No. 3,011,920, to provide an active surface for the electrode prior to deposition of $Li_2CO_3$. The finished Electrode E contains a comparable amount of lithium-containing components, including $Li_2CO_3$, as those in Electrodes B–D.

After assembling each of the electrodes (i.e., Electrodes A–E) into five separate lithium-ion electrochemical cells, the electrochemical cell runs are carried out in a 15 ml, three-electrode cell with a working electrode area of 1.12 $cm^2$. The counter and reference electrodes are lithium foils (Cyprus Foote Mineral). A fiberglass separator located between the working and reference electrodes separates an electrolyte containing 0.5 M lithium trifluoromethane-sulfonimide in a 50:50 mixture of ethlylene carbonate and dimethyl carbonate. The cells are tested in a dry argon-atmosphere glove box at 20 degrees C. The charge/discharge rate is C/24 based on a $LiC_6$ composition.

The electrochemical performance of the unmodified and modified electrodes for lithium intercalation and ICL are summarized in Table 1. The ICL is the difference between the first cycle discharge (intercalation) and charge (deintercalation) capacities. The data in Table 1 show average values for at least two runs.

TABLE 1

| Electrode | pass comp/C | x in $Li_xC_6$ | ICL,mAh/g |
|---|---|---|---|
| A. | acf (untreated) | 0.4 | 865 |
| B. | $Li_2CO_3$/acf(EtOH) | 0.4 | 750 |
| C. | $Li_2CO_3$/acf | 0.4 | 670 |
| D. | $Li_2CO3$/acf(EOH) × 2 | 0.35 | 625 |
| E. | $Li_2CO_3$/acf/Sn—Pd | 0.11 | 403 |

It can be seen that the first cycle loss of capacity for the above cell runs is reduced in the presence of a carbon anode of the invention prefabricated prior to cell assembly to contain lithium-containing passivating film components on the passivating layer of the carbon. Also, the predetermined amounts (Electrodes C and D) of the passivating film components incorporated by different methods of preparation enhance the reduction of the ICL (compared to Electrodes B). Furthermore, pretreatment of the carbon surface with colloidal metal species (Electrode E) enhances the reduction of the ICL (compared to Electrode B) in a highly improved manner. The predetermined deposit of lithium-containing passivating film component(s) on Electrodes B–E also enhances any passivating layer on Electrode A having an electrochemically-produced ratio of passivating film components deposited during the first cycle.

EXAMPLE 2

A petroleum fuel green coke (FGC) having a particle size in the range from 30–60 microns and a surface area of 3.3 $m^2$/g is fabricated into a carbon electrode useful as a carbon anode (Electrode F). Electrode F is compared in a lithium-ion cell in the same manner as in Example 1 to a carbon anode of the invention (Electrode G) having 0.007 weight percent of $Li_2CO_3$-containing passivating film component, calculated as Li. Electrode G is prepared in the same manner as Electrode B in Example 1, except for the petroleum fuel green coke starting material. The data in Table 2 show average values for at least two runs.

TABLE 2

| Electrode | pass comp/C | x in $Li_xC_6$ | ICL,mAh/g |
|---|---|---|---|
| F. | FGC (untreated) | 0.95 | 198 |
| G. | $Li_2CO_3$/FGC(EtOH) | 0.95 | 181 |

As indicated in Table 2, low surface area carbon in a modified carbon anode of the invention also exhibits reduced ICL in the first cycle of the lithium-ion cell. A predetermined amount of lithium-containing passivating film component reduces the ICL and enhances any passivating layer on Electrode G having an electrochemically-produced ratio of passivating film components deposited during the first cycle.

Both Examples 1 and 2 illustrate that a prefabricated dry modified carbonaceous anode, having a predetermined amount of passivating film component(s) in a ratio other than that achieved during or after the first cycle of the cell, can be assembled into a lithium-ion, rechargeable battery or cell to reduce the ICL. Although $Li_2CO_3$ has been exemplified as an effective passivating film component, others such as $Li_2O$ and LiOH provide suitable reduction of ICL.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for modifying a surface property of a carbon anode useful in a lithium-ion rechargeable battery, said method comprising:

contacting a solid carbonaceous material with one or more lithium-containing passivating film components, heating said solid carbonaceous material containing said passivating film components in the presence of a gas to form a lithium-containing passivating layer on a surface of said solid carbonaceous material.

2. The method of claim 1 wherein said passivating film layer comprises one or more passivating film components in a non-electrochemically-produced ratio.

3. The method of claim 1 wherein said solid carbonaceous material has a surface area greater than about 0.5 $m^2$/g.

4. The method of claim 1 wherein said heating occurs in the presence of argon, hydrogen or $CO_2$.

5. The method of claim 1 wherein said passivating film component selected from the group consisting of $Li_2CO_3$, LiOH, $Li_2O$, LiCl, LiF, LiBr, LiI, and a lithium alkyl carbonate.

6. The method of claim 1 wherein prior to or during said contacting of said passivating film component, at least one colloidal metal species is deposited on said surface of said solid carbonaceous material.

7. The method of claim 1 wherein said solid carbonaceous material is selected from the group consisting of synthetic graphite, natural graphite, graphitized pretroleum coke, graphitized carbon black, green coke, needle coke, sponge coke, carbon black, powdered graphite, carbon materials doped with phosphous, boron or silicon, polyacrilonitrile-based carbons, and hard, organic-polymer-based carbonaceous materials.

8. The method of claim 1 wherein said heating is at a temperature from above about 20 degrees C. to about 120 degrees C.

9. A method for preparing a carbonaceous anode useful in a lithium-ion rechargeable battery, said method comprising:

contacting one or more lithium-containing passivating film components with a solid carbonaceous material to form a solid carbonaceous material containing said passivating film components, heating said solid carbonaceous material containing said passivating film components in the presence of $CO_2$ at above about 20 degrees to about 120 degrees C. to form a passivating layer on a surface of solid carbonaceous material.

10. The method of claim 9 wherein said lithium-containing passivating film a component comprises a carbonate of lithium.

11. The method of claim 9 wherein said passivating layer comprises said lithium-containing passivating film components in an electrochemically-produced ratio plus an additional amount of at least one of said lithium-containing components.

12. The method of claim 9 wherein said heating occurs at about 25 degrees to about 50 degrees C. for at least 0.5 hr.

13. The method of claim 9 wherein said solid carbonaceous material has a surface area greater than about 0.5 $m^2$/g to about 30 $m^2$/g.

14. The method of claim 9 wherein said heating occurs in the presence of argon, hydrogen or $CO_2$.

15. The method of claim 9 wherein said passivating film components are selected from the group consisting of $Li_2CO_3$, LiOH, $Li_2O$, LiCl, LiF, LiBr, LiI, and a lithium alkyl carbonate.

16. The method of claim 9 wherein prior to or during said contacting of said passivating film components, at least one colloidal metal species is deposited on said surface of said solid carbonaceous material.

17. The method of claim 9 wherein said solid carbonaceous material is selected from the group consisting of synthetic graphite, natural graphite, graphitized pretroleum coke, graphitized carbon black, green coke, needle coke, sponge coke, carbon black, powdered graphite, carbon materials doped with phosphous, boron or silicon, polyacrilonitrile-based carbons, and hard, organic-polymer-based carbonaceous materials.

18. A dry carbon-containing composition useful for anodes in a lithium-ion rechargeable battery, said composition comprising:

solid carbonaceous material having a surface area less than 5 $m^2/g$, a passivating layer comprising about 0.01 to about 2 weight percent of lithium carbonate on a surface of said solid carbonaceous material.

19. The composition of claim 18 wherein said passivating layer consisting essentially of said lithium carbonate.

20. The composition of claim 18 where said passivating layer further comprising at least one colloidal metal species selected from the group consisting of copper, nickel, cobalt, silver, gold, chromium, platinum, palladium, tin, and mixtures thereof.

21. A method for reducing the irreversible capacity loss during first cycle in a lithium-ion rechargeable battery, said method comprising:

constructing a lithium-ion rechargeable battery containing a carbonaceous anode comprising a passivating layer containing a predetermined amount of lithium-containing passivating film component selected from the group consisting of lithium carbonate, lithium oxide, lithium hydroxide and a lithium halide, and wherein prior to said constructing, said predetermined amount of lithium-containing passivating film component impregnated onto a porous surface of said carbonaceous anode and heated in the presence of $CO_2$ to a temperature from above about 20 degrees C. to about 120 degrees C.

22. The method of claim 21 wherein a colloidal tin metal species is electrolessly deposited onto said porous surface prior to said lithium-containing film component being impregnated onto said porous surface.

23. A rechargeable lithium-ion battery comprising:

a cathode containing lithium ions in its structure, an anode containing carbonaceous material having a passivating layer on its surface, a non-aqueous, electrolyte conductive of lithium ions between said anode and said cathode, and wherein said passivating layer comprising one or more passivating film components in a non-electrochemically-produced ratio.

24. A carbonaceous anode of a lithium-ion rechargeable battery, said anode comprising one or more passivating film components in a passivating layer on a surface of said anode in a weight ratio other than a weight ratio derived from said battery at the end of the first cycle of said battery.

25. The anode of claim 24 wherein said passivating layer contains at least one passivating film component in an amount more than its amount in said ratio derived from said battery at the end of said first cycle of said battery.

26. The anode of claim 24 wherein said passivating layer contains at least one passivating film component in an amount less than its amount in said ratio derived from said battery at the end of said first cycle of said battery.

27. The anode of claim 24 wherein said passivating layer consists essentially of lithium carbonate.

28. A dry carbon-containing composition useful for anodes in a lithium-ion rechargeable battery, said composition comprising:

solid carbonaceous material having a surface area less than 15 $m^2/g$, a passivating layer comprising about 0.001 to about 1.5 weight percent, calculated as Li, of additional lithium-containing passivating film component on a surface of said solid carbonaceous material compared to the amount of said passivating film component on said surface at the end of the first cycle of said battery.

29. The composition of claim 28 wherein said passivating film component comprises a lithium-containing component.

30. The composition of claim 28 wherein said solid carbonaceous material is selected from the group consisting of synthetic graphite, natural graphite, graphitized petroleum coke, graphitized carbon black, green coke, needle coke, sponge coke, carbon black, powdered graphite, carbon materials doped with phosphous, boron or silicon, polyacrilonitrile-based carbons, and hard, organic-polymer-based carbonaceous materials.

31. A method for producing a carbon anode for use in a lithium-ion rechargeable battery, said method comprising:

contacting a solid carbonaceous material with one or more lithium-containing passivating film components, and drying said solid carbonaceous material containing said passivating film components to form a lithium-containing passivating layer on a surface of said solid carbonaceous material.

32. The method of claim 1 wherein said drying accomplished by evacuating liquid from said solid carbonaceous material containing said passivating film components.

33. The method of claim 31 wherein said drying accomplished by heating said solid carbonaceous material containing said passivating film components.

* * * * *